Patented Aug. 30, 1932

1,874,886

UNITED STATES PATENT OFFICE

HUGH MILLS BUNBURY, OF PRESTWICH, JOHN STANLEY HERBERT DAVIES, OF CRUMPSALL, AND WILLIAM JOHNSON SMITH NAUNTON, OF PRESTWICH, ENGLAND, ASSIGNORS TO IMPERIAL CHEMICAL INDUSTRIES LIMITED, A CORPORATION OF GREAT BRITAIN

VULCANIZATION OF RUBBER AND NEW COMPOUND THEREFOR

No Drawing. Application filed October 28, 1931, Serial No. 571,678, and in Great Britain November 3, 1930.

This invention relates to the vulcanization of rubber and rubber-like substances and in particular to the use, as accelerators of vulcanization, of a new group of substances as hereinafter described.

According to the invention we effect vulcanization of rubber and rubber-like substances in the presence of a compound having the general formula

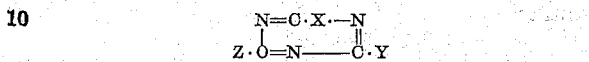

wherein X represents a substituted amino group, Y and Z represent 2-mercapto-arylene-thiozole residues,

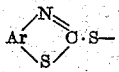

(Ar being an ortho arylene radical).

By the process of our invention vulcanization takes place smoothly and effectively at an appropriate temperature, e. g. 140° C., whereas at lower temperature, e. g. up to 100°, little or no vulcanization takes place. We thus avoid "scorching", i. e. premature vulcanization during milling, mixing and calendering. Our new accelerators may thus be described as exhibiting the property of "delayed action".

The improvements resulting from our new process are favourably displayed when our new accelerators are applied in conjunction with a basic accelerator, e. g. diphenyl-guanidine.

Compounds having the above general formula, may be made by effecting interaction between cyanuric chloride and one molecular proportion of a primary arylamine (compare, e. g. Fries, Berichte, 1886, 19, 2056), followed by condensation with two molecular proportions of an alkali salt of a 2-mercaptoaryl-enethiazole, or by condensing cyanuric chloride first with two molecular proportions of a 2-mercaptoarylenethiazole (preferably as alkali salt) and then with a primary arylamine. Thus Fries' "primary β-naphthyl-amino-cyanuric chloride" is obtained by treating cyanuric chloride with two molecular proportions of β-naphthylamine. This compound is heated in acetone solution with two molecular proportions of the sodium salt of 2-mercaptobenzthiazole to give one of our new vulcanization accelerates.

The invention is illustrated but not limited by the following examples, in which the parts are by weight.

Example 1

6.2 parts of the sodium salt of mercaptobenzthiazole are dissolved in 50 parts of acetone, and the solution obtained is added with stirring to a solution of 5.3 parts of the interaction product of one molecular proportion of cyanuric chloride and two molecular proportions of β-naphthylamine prepared as described by Fries (Berichte, 1856, 19, 2056) in 35 parts of acetone. The mixture is boiled under reflux and a heavy white precipitate is formed. After cooling the separated compound is removed by filtration, washed with water and dried. It has a melting point of 184–186° C.

0.25 part of the new compound are mixed with 0.25 part of diphenylguanidine and the mixture is compounded with rubber compounded as follows:—100 parts of pale crepe rubber, 75 parts barytes, 10 parts zinc oxide, and 2.5 parts sulphur. When vulcanized at 141° C. for 20 minutes, the product has a tensile strength at break of 152 kg. per sq. cm. whereas when vulcanized at 110° C. for 50 minutes the product has a tensile strength at break of only 8.4 kg. per sq. cm. The percentage elongations at break are 788 and 800, respectively.

Example 2

In this example there are used compounds of the formula

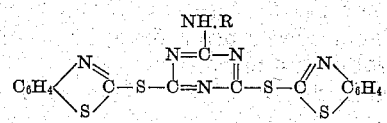

(where R is phenyl, o-tolyl, or p-tolyl) obtained either by a process similar to that described above or as follows:—

9.2 parts of finely divided cyanuric chloride are dissolved in 44 parts of benzene. The solution is then cooled to 10° C. and well-stirred. 9.3 parts of aniline dissolved in 44 parts of benzene are quickly added. During this reaction the temperature rises to about 50-60° C. Continued stirring and cooling soon reduces the temperature to about 20° C. and stirring at this temperature is continued for about ½ hour. The aniline hydrochloride which separates as a white precipitate is then filtered off and washed with a further quantity of benzene. 18.9 parts of the sodium salt of mercapto-benzthiazole are well powdered and added to the combined benzene filtrates, and the mixture is stirred and boiled under reflux for about five hours. After the reaction is complete, the mixture is cooled and filtered.

The solid material is washed with dilute aqueous caustic soda until alkali soluble material is removed, then washed with water and dried. It is a white powder, soluble in toluene, m. p. about 176–181° C.

The product obtained by using 10.7 parts of o-toluidine instead of 9.3 parts of aniline has m. p. about 126° C., and that obtained similarly but using 10.8 parts of p-toluidine has m. p. 185–190° C.

A rubber mix composed as follows:—

|  | Parts |
|---|---|
| Pale crepe rubber | 100 |
| Barytes | 75 |
| Zinc oxide | 10 |
| Sulphur | 2.5 |
| Diphenylguanidine | 0.25 |
| New compound | 0.25 | is made up and vulcanized at the usual vulcanizing temperature, viz. 141° C. In order to demonstrate that vulcanization does not proceed at a lower temperature, a test is also carried out at 110° C. The following results are obtained:—

| New compound used | Cured 20 minutes at 141° C. | | Cured 50 minutes at 110° C. | |
|---|---|---|---|---|
|  | Tensile strength at break in kg. per sq. cm. | % age elongation at break | Tensile strength at break in kg. per sq. cm. | % age elongation at break |
| Anilino-compound | 144 | 793 | 8.0 | 651 |
| o Toluidino-compound | 154 | 750 | 15.7 | 724 |
| p-Toluidino-compound | 140 | 750 | 8.7 | 693 |

Since many embodiments of this invention, differing widely in one or more respects, may be made without departing from the spirit of our invention, it is to be understood that we do not limit ourselves to the foregoing examples or description except as indicated in the following claims.

We claim:

1. The process of producing a new chemical compound which is an effective accelerator for the vulcanization of rubber, which comprises condensing cyanuric chloride with one molecular proportion of a primary aromatic amine and two molecular proportions of a 2-mercaptoarylenethiazole.

2. The process of producing a new chemical compound which is an effective accelerator for the vulcanization of rubber, which comprises condensing cyanuric chloride with one molecular proportion of a primary aromatic amine and two molecular proportions of an alkali metal salt of a 2-mercaptoarylenethiazole.

3. The process of producing a new chemical compound which is an effective accelerator for the vulcanization of rubber, which comprises condensing a primary arylaminocyanuric chloride with two molecular proportions of a 2-mercaptoarylenethiazole.

4. The process of producing a new chemical compound which is an effective accelerator for the vulcanization of rubber, which comprises condensing a primary arylaminocyanuric chloride with two molecular proportions of an alkali metal salt of a 2-mercaptoarylenethiazole.

5. A new chemical compound suitable for use as an accelerator in the vulcanization of rubber, which possesses the probable formula:

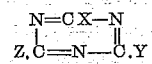

wherein X represents an arylamino-group, and Y and Z represent 2-mercaptoarylenethiazole residues,

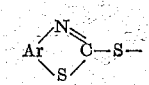

Ar being an o-arylene radical.

6. The process of vulcanizing rubber or rubber-like substances, which consists in adding to the mix a vulcanization accelerator produced by the process of claim 1, preferably in the presence of a basic organic accelerator.

7. The process of vulcanizing rubber or rubber-like substances, which consists in adding to the mix a vulcanization accelerator produced by the process of claim 2, preferably in the presence of a basic organic accelerator.

8. The process of vulcanizing rubber or rubber-like substances, which consists in adding to the mix a vulcanization accelerator produced by the process of claim 3, preferably in the presence of a basic organic accelerator.

9. The process of vulcanizing rubber or rubber-like substances, which consists in adding to the mix a vulcanization accelerator produced by the process of claim 4, preferably in the presence of a basic organic accelerator.

10. The process of vulcanizing rubber or rubber-like substances, which consists in adding to the mix a vulcanization accelerator obtainable by the process of claim 1, preferably in the presence of diphenylguanidine.

11. The process of vulcanizing rubber or rubber-like substances, which consists in adding to the mix a vulcanization accelerator obtainable by the process of claim 2, preferably in the presence of diphenylguanidine.

12. The process of vulcanizing rubber or rubber-like substances, which consists in adding to the mix a vulcanization accelerator obtainable by the process of claim 3, preferably in the presence of diphenylguanidine.

13. The process of vulcanizing rubber or rubber-like substances, which consists in adding to the mix a vulcanization accelerator obtainable by the process of claim 4, preferably in the presence of diphenylguanidine.

14. The process of producing a new chemical compound which comprises condensing cyanuric chloride with one molecular proportion of a primary aromatic amine of the group consisting of aniline, o-toluidine and p-toluidine and two molecular proportions of an alkali metal salt of a 2-mercaptoarylenethiazole.

15. The process of producing a new chemical compound which comprises condensing cyanuric chloride with one molecular proportion of a primary aromatic amine of the group consisting of aniline, o-toluidine and p-toluidine and two molecular proportions of an alkali metal salt of a 2-mercaptobenzthiazole.

16. The process of producing a new chemical compound which comprises condensing cyanuric chloride with two molecular proportions of β-naphthylamine and two molecular proportions of an alkali metal salt of a 2-mercaptoarylenethiazole.

17. The process of producing a new chemical compound which comprises condensing cyanuric chloride with two molecular proportions of β-naphthylamine and two molecular proportions of an alkali metal salt of a 2-mercaptobenzthiazole.

18. A new chemical compound obtainable by condensing cyanuric chloride with at least one molecular proportion of an amine of the group consisting of β-naphthylamine, aniline, o-toluidine, and p-toluidine and two molecular proportions of an alkali metal salt of a 2-mercaptoarylenethiazole.

19. A new chemical compound obtainable by condensing cyanuric chloride with at least one molecular proportion of an amine of the group consisting of β-naphthylamine, aniline, o-toluidine and p-toluidine and two molecular proportions of an alkali metal salt of a 2-mercaptobenzthiazole.

20. The process of vulcanizing rubber or rubber-like substances, which comprises adding to the mix a vulcanization accelerator obtainable by the process of claim 14, and a basic organic accelerator such as diphenylguanidine, and then subjecting the mix to vulcanizing conditions.

21. The process of vulcanizing rubber or rubber-like substances, which comprises adding to the mix a vulcanization accelerator obtainable by the process of claim 15, and a basic organic accelerator such as diphenylguanidine, and then subjecting the mix to vulcanizing conditions.

22. The process of vulcanizing rubber or rubber-like substances, which comprises adding to the mix a vulcanization accelerator obtainable by the process of claim 16, and a basic organic accelerator such as diphenylguanidine, and then subjecting the mix to vulcanizing conditions.

23. The process of vulcanizing rubber or rubber-like substances, which comprises adding to the mix a vulcanization accelerator obtainable by the process of claim 17, and a basic organic accelerator such as diphenylguanidine, and then subjecting the mix to vulcanizing conditions.

In testimony whereof we have affixed our signatures.

HUGH MILLS BUNBURY.
JOHN STANLEY HERBERT DAVIES.
WILLIAM JOHN. SMITH NAUNTON.